(12) United States Patent
Castro et al.

(10) Patent No.: US 8,317,432 B2
(45) Date of Patent: Nov. 27, 2012

(54) AIR VALVE PNEUMATIC TUBE CARRIER SYSTEM

(75) Inventors: Raymond Anthony Castro, Denver, CO (US); Chad David Cornelius, Highlands Ranch, CO (US); Kenneth Michael Hoganson, Aurora, CO (US); James Joseph Podracky, Denver, CO (US); Robert Paul Trenconsky, Elizabeth, CO (US)

(73) Assignee: Translogic Corporation, Denver, CO (US)

( * ) Notice: Subject to any disclaimer, the term of this patent is extended or adjusted under 35 U.S.C. 154(b) by 373 days.

(21) Appl. No.: 12/575,020

(22) Filed: Oct. 7, 2009

(65) Prior Publication Data

US 2010/0111617 A1    May 6, 2010

Related U.S. Application Data

(60) Provisional application No. 61/104,159, filed on Oct. 9, 2008.

(51) Int. Cl.
 *B65G 51/24* (2006.01)
(52) U.S. Cl. ........................................ 406/183; 406/191
(58) Field of Classification Search ................ 406/11, 406/181, 183, 191
 See application file for complete search history.

(56) References Cited

U.S. PATENT DOCUMENTS

| | | | |
|---|---|---|---|
| 1,753,987 A | 4/1930 | Hohne | |
| 1,823,056 A | 9/1931 | Marburg | |
| 2,043,293 A | 6/1936 | Jennings | |
| 3,055,612 A | 7/1936 | Stout et al. | |
| 2,174,718 A | 10/1939 | Drenkard, Jr | |
| 2,679,990 A | 6/1954 | Mathzeit et al. | |
| 2,709,555 A | 5/1955 | Schroder | |
| 2,773,658 A | 12/1956 | Otteren et al. | |
| 2,797,057 A | 6/1957 | Sindzinski et al. | |
| 2,815,182 A | 12/1957 | Mittag et al. | |
| 2,850,249 A | 9/1958 | Understadt | |
| 2,865,578 A | 12/1958 | Hennessy | |
| 2,943,814 A | 7/1960 | Mittag et al. | |
| 2,970,791 A | 2/1961 | Hafner et al. | |
| 2,997,253 A | 8/1961 | Mittag et al. | |
| 3,055,611 A | 9/1962 | Stout et al. | |
| 3,148,845 A | 9/1964 | Buchwald et al. | |
| 3,219,989 A | 11/1965 | Kuhrt et al. | |
| 3,223,353 A | 12/1965 | Kuhrt et al. | |
| 3,238,515 A | 3/1966 | Schrader et al. | |
| 3,265,325 A | 8/1966 | Buchwald et al. | |
| 3,295,662 A | 1/1967 | Crosby et al. | |
| 3,332,639 A | 7/1967 | Joy | |
| 3,333,787 A | 8/1967 | Voitas et al. | |
| 3,361,384 A | 1/1968 | Thorburn | |
| 3,408,113 A | 10/1968 | Bouladon | |
| 3,507,460 A | 4/1970 | Norman et al. | |
| 3,629,231 A | 12/1971 | Kalthoff | |
| 3,813,058 A | 5/1974 | Smith et al. | |

(Continued)

*Primary Examiner* — Joseph A Dillon, Jr.
(74) *Attorney, Agent, or Firm* — Marsh Fischmann & Breyfogle LLP

(57) ABSTRACT

A valve device and method are provided that are operative to selectively divert the flow of air within a pneumatic carrier within a pneumatic carrier system. Generally, the device includes a pneumatic tube that is sized to permit the passage of pneumatic carriers. The pneumatic tube includes at least aperture in a sidewall of the pneumatic tube, an outer sleeve, and an actuator. The actuator acts on the outer sleeve to block and open the aperture to fluid flow in order to divert air in the pneumatic system. In one embodiment, the valve is disposed in a pneumatic system in conjunction with a pneumatic carrier handling device.

25 Claims, 10 Drawing Sheets

U.S. PATENT DOCUMENTS

| | | | |
|---|---|---|---|
| 3,892,372 A | | 7/1975 | Hauber |
| 4,058,274 A | | 11/1977 | Hochradel et al. |
| 4,059,246 A | * | 11/1977 | Anders et al. .................. 406/31 |
| 4,234,271 A | | 11/1980 | Kalina |
| 4,240,768 A | | 12/1980 | Carstens |
| 4,256,418 A | * | 3/1981 | Stangl .......................... 406/112 |
| 4,502,215 A | | 3/1985 | Davis et al. |
| 4,509,123 A | | 4/1985 | Vereen |
| 4,516,888 A | | 5/1985 | Kardinal |
| 4,529,335 A | | 7/1985 | Hilbert et al. |
| 4,630,216 A | | 12/1986 | Tyler et al. |
| 4,646,245 A | | 2/1987 | Prodel et al. |
| 4,786,229 A | | 11/1988 | Henderson |
| 4,831,540 A | | 5/1989 | Hesser |
| 4,941,181 A | | 7/1990 | Igarashi et al. |
| 4,971,481 A | | 11/1990 | Foreman |
| 4,974,166 A | | 11/1990 | Maney et al. |
| 5,097,421 A | | 3/1992 | Maney et al. |
| 5,153,842 A | | 10/1992 | Dulugos et al. |
| 5,166,884 A | | 11/1992 | Maney et al. |
| 5,190,428 A | | 3/1993 | Bryant et al. |
| 5,196,846 A | | 3/1993 | Brockelsby et al. |
| 5,217,328 A | | 6/1993 | Lang |
| 5,225,990 A | | 7/1993 | Bunce et al. |
| 5,234,292 A | | 8/1993 | Lang |
| 5,260,694 A | | 11/1993 | Remahl |
| 5,386,364 A | | 1/1995 | Tyler |
| 5,434,790 A | | 7/1995 | Saka et al. |
| 5,436,611 A | | 7/1995 | Arlinghaus, Jr. |
| 5,562,367 A | | 10/1996 | Scott |
| 5,655,677 A | | 8/1997 | Fratello et al. |
| 5,661,743 A | | 8/1997 | Nagai |
| 5,712,789 A | | 1/1998 | Radican |
| 5,725,124 A | * | 3/1998 | Bustos et al. .................. 221/211 |
| 5,864,485 A | | 1/1999 | Hawthorne et al. |
| 5,867,388 A | | 2/1999 | Okumura et al. |
| 5,959,568 A | | 9/1999 | Woolley |
| 5,980,164 A | * | 11/1999 | Fratello .......................... 406/190 |
| 6,024,208 A | | 2/2000 | Chooi et al. |
| 6,068,428 A | | 5/2000 | Nair et al. |
| 6,076,652 A | | 6/2000 | Head, III |
| 6,138,058 A | | 10/2000 | Van Antwerp et al. |
| 6,146,057 A | | 11/2000 | Gromley et al. |
| 6,173,212 B1 | | 1/2001 | Valerino, Sr. |
| 6,202,004 B1 | | 3/2001 | Valerino, Sr. |
| 6,290,434 B1 | | 9/2001 | Celada-Gonzalez et al. |
| 6,292,710 B1 | | 9/2001 | Bonnet |
| 6,356,802 B1 | | 3/2002 | Takehara et al. |
| 6,437,272 B2 | | 8/2002 | Tamamoto et al. |
| 6,477,442 B1 | | 11/2002 | Valerino, Sr. |
| 6,516,239 B1 | | 2/2003 | Madden et al. |
| 6,539,360 B1 | | 3/2003 | Kadaba |
| 6,600,418 B2 | | 7/2003 | Francis et al. |
| 6,659,693 B1 | | 12/2003 | Perkins et al. |
| 6,665,586 B1 | | 12/2003 | Ball et al. |
| 6,672,808 B1 | | 1/2004 | McIntyre et al. |
| 6,702,150 B2 | | 3/2004 | Sumetzberger |
| 6,711,463 B2 | | 3/2004 | Tozuka et al. |
| 6,747,560 B2 | | 6/2004 | Stevens, III |
| 6,762,382 B1 | | 7/2004 | Danelski |
| 6,878,896 B2 | | 4/2005 | Braginsky et al. |
| 6,887,358 B2 | | 5/2005 | Elger |
| 6,911,910 B2 | | 6/2005 | Sansone et al. |
| 6,932,544 B2 | | 8/2005 | McMahon et al. |
| 6,939,088 B2 | | 9/2005 | Farrell |
| 6,950,724 B2 | | 9/2005 | Mileaf et al. |
| 6,959,229 B2 | | 10/2005 | Eidemiller |
| 7,079,913 B2 | | 7/2006 | Kato et al. |
| 7,092,788 B2 | | 8/2006 | Brixius et al. |
| 7,104,734 B2 | | 9/2006 | Smith et al. |
| 7,136,721 B2 | | 11/2006 | Sano et al. |
| 7,151,980 B2 | | 12/2006 | You et al. |
| 7,196,627 B2 | | 3/2007 | Rommelmann et al. |
| 7,234,898 B2 | * | 6/2007 | Brown .......................... 406/110 |
| 7,243,002 B1 | * | 7/2007 | Hoganson et al. ............. 700/215 |
| 7,264,421 B2 | * | 9/2007 | Brown .......................... 406/112 |
| 7,314,339 B1 | * | 1/2008 | Christian et al. ............. 406/112 |
| 7,326,005 B1 | | 2/2008 | Castro et al. |
| 7,328,084 B1 | | 2/2008 | Hoganson et al. |
| 7,363,106 B1 | | 4/2008 | Hoganson et al. |
| 7,424,340 B2 | * | 9/2008 | Owens .......................... 700/230 |
| 7,524,145 B2 | * | 4/2009 | Heinz .......................... 406/116 |
| 7,950,879 B2 | * | 5/2011 | Hoganson et al. ............. 406/12 |
| 7,953,515 B2 | * | 5/2011 | Hoganson et al. ............. 700/225 |
| 2008/0298907 A1 | * | 12/2008 | Scott .......................... 406/154 |

* cited by examiner

AIR VALVE PNEUMATIC TUBE CARRIER SYSTEM

CROSS-REFERENCE TO RELATED APPLICATION

This application claims priority and the benefit of the filing date under 35 U.S.C. 119 to U.S. Provisional Application No. 61/104,159, entitled, "AIR VALVE FOR PNEUMATIC TUBE CARRIER SYSTEM," filed on Oct. 9, 2008, the contents of which are incorporated herein as if set forth in full.

FIELD OF INVENTION

The presented inventions relate generally to the field of pneumatic tube carrier systems. More particularly, the presented inventions relate to systems and methods for diverting air to and/or from pneumatic tubes that transport pneumatic carriers.

BACKGROUND

Pneumatic tube carrier systems are a well-known means for the automated transport of materials between, for example, an origination location to any one of a plurality of destination locations. A typical system includes a number of pneumatic tubes interconnected in a network to transport carriers between a number of user stations. Various blowers and transfer units provide the force and path control means, respectively, for moving the carriers through and from tube-to-tube within the system. Transfer units allow pneumatic carries to be moved from a first pneumatic tube to a second pneumatic tube in order to route the pneumatic carrier between locations, or stations, in the system/network.

The pneumatic tubes that connect the various system components may be arranged in any manner that allows the carriers to be transferred between various stations. These pneumatic tubes transmit air pressure or vacuum from the various blowers to effectuate the movement of carriers through the system. If a carrier is brought to a stop in the system to await transport through a subsequent portion of the system, the stationary carrier may prevent operation of downstream system components. Accordingly, while the carrier is stopped, it may be desirable or necessary to route airflow around the carrier.

SUMMARY

One problem associated with diverting air out of a pneumatic tube, around a blockage, (e.g., through a bypass duct) and back into the pneumatic tube is the resulting air pressure drop that can compromise the operation of downstream system components. To avoid this problem, pneumatic systems have previously placed system components that may periodically impede airflow at the boundaries of airflow zones of the system. In such an arrangement, airflow on a first side of the system component is provided by a first prime mover (e.g., blower, compressor, etc) and airflow on a second side of the system component is provided by a second prime mover. That is, rather than diverting around the system component, separate blowers are utilized to provide separate airflow streams. While avoiding the pressure drop issue, this arrangement limits the configuration of the pneumatic system and/or complicates the configuration of the system.

The present inventors have recognized that effective air flow diversion in pneumatic tube systems has previously been limited by diversion port and/or valve sizing constraints. That is, previous diversion ports and/or valves that divert airflow out of or into pneumatic tubes have not provided flow paths of sufficient size to divert air around an occupied system component (e.g., blockage). The inventors have recognized that one drawback of prior devices is the inability to create a large enough opening in a pneumatic tube sidewall to effectively divert airflow carried by the main bore of the pneumatic tube without affecting passage of a pneumatic carrier through the pneumatic tube.

In order to provide a valve that allows for effectively diverting most or all of the typically high volume low pressure airflow out of a pneumatic tube and/or back into that pneumatic tube with minimal airflow constriction/pressure loss, the present inventors have developed novel systems and methods (i.e., utilities) that allow for diverting more airflow into or out of a pneumatic tube without affecting passage of a carrier through the tube. The utilities in one aspect are directed towards a valve that utilizes a sleeve-in-sleeve valve arrangement that allows for increasing the cross-sectional area of a flow path through the diversion path of the valve without affecting passage of a pneumatic carrier through the valve. Typically, such a valve utilizes a pneumatic tube section having multiple fluid flow ports that are separated by sufficient structure to support a carrier as it passes through.

According to a first aspect, the utility comprises a valve for a pneumatic tube carrier system including a pneumatic tube having an internal bore extending between a tube inlet a tube outlet where the internal bore has an internal diameter that is sized to accommodate the passage of a pneumatic carrier. A sidewall of the pneumatic tube includes a first plurality of apertures that extend through the sidewall. An outer sleeve is disposed adjacent to an outside surface of the pneumatic tube such that the outer sleeve circumferentially surrounds at least a portion of the pneumatic tube (e.g., inner sleeve). An actuator is operative to selectively move the outer sleeve with respect to the pneumatic tube from a first open position to a second closed position. When the outer sleeve is in the open position the outer sleeve allows for fluid passage through the first plurality of apertures. When the outer sleeve is in the closed position the outer sleeve limits or prevents fluid passage through the first plurality of apertures.

In one arrangement, the cross-sectional area of the plurality of apertures through the sidewalls of the inner and/or outer sleeves are sized in relation to the cross-sectional area of the bore of the inner, sleeve member. That is, the apertures may be sized to accommodate the entire fluid flow passing through a pneumatic tube. In one arrangement, the cross-sectional area of the plurality of apertures is at least fifty percent or at least seventy percent of the cross-sectional area of the pneumatic tube to which the valve may be interconnected. Accordingly, airflow may be diverted out of the valve with reduced pressure losses.

In one arrangement, the outer sleeve is an arcuate member that partially surrounds the inner sleeve. In another arrangement, the outer sleeve is a tubular member that circumferentially surrounds the inner sleeve. In one arrangement the outer sleeve has a solid sidewall and is adapted to move between open and closed position where the outer sleeve overlays the plurality of apertures through the inner sleeve in the closed position. In another arrangement, the outer sleeve includes a plurality of apertures that may be aligned and misaligned with the apertures in the inner sleeve.

As noted, the actuator is operative to move the outer sleeve relative to the inner sleeve. Such movement may be axial movement (e.g., aligned with the central axis of the inner sleeve) or radial movement where the outer sleeve rotates around the inner sleeve.

The size and location of the apertures extending through the inner sleeve may be sized to permit passage of a pneumatic carrier through the internal bore of the pneumatic tube. That is, these apertures may be sized to reduce the likelihood that wear bands on the carrier will engage the edge surfaces of the apertures. In this regard, the arc length of the apertures is typically less than about 1.75 radians. That is, the included angle of any aperture as measured from the center line of the bore of the pneumatic tube is typically less than about 100 degrees and more preferably less than about 70 degrees. In one arrangement, a plurality of the elongated apertures are disposed adjacent to one another and may be evenly spaced around the circumference of the inner sleeve. The portion of the sidewall of the inner sleeve through which the apertures are formed and or the individual apertures themselves may have a length that is less than about twice the diameter of the pneumatic tube and more preferably less than about 1.5 times the diameter of the pneumatic tube.

A second aspect of the present invention includes a pass-through air valve for use in a pneumatic carrier system. The utility includes a tube having an internal bore extending between an inlet and an outlet. The internal bore of the tube has an inside diameter sized to accommodate passage of a pneumatic carrier. At least first and second apertures extend through a sidewall of the tube, where a combined area of those apertures is at least half of the cross-sectional area of the internal bore. An arcuate member is conformally positioned around at least a portion of an outside surface of the tube. An actuator is operative to move the arcuate member between open and closed positions, where the arcuate member covers the apertures in the closed position.

Another aspect is directed towards an airflow by-pass or diversion system for use in a pneumatic carrier system, which allows for diverting airflow around a blockage within a pneumatic tube and/or around a system component. The system includes a first ported pneumatic tube having an internal bore sized accommodate the passage of a pneumatic carrier. The first ported pneumatic tube includes a plurality of ports extending through a first sidewall section. The system further includes a second ported pneumatic tube having a second internal bore sized to accommodate the passage of the pneumatic carrier. The second ported pneumatic tube also includes a plurality of ports extending through a second sidewall section. Typically, these first and second ported tubes are disposed on opposing sides of a pneumatic tube section or a pneumatic system component which may periodically hold a pneumatic carrier or otherwise prevent airflow there through. The ports within the first and second ported tubes are interconnected by a bypass duct that fluidly interconnects the first and second plurality of ports. A valve associated with the duct allows for selectively permitting fluid flow through the duct. That is, the valve may be open and closed to allow bypass airflow around a system component or tube section disposed between the ported tubes.

Typically, the plurality of ports each has a combined cross-sectional area that is at least 50% of the cross-sectional area of the internal bore of their respective pneumatic tube. More preferably, these ports have a combined cross-sectional area that is at least 70% of the cross-sectional area of the internal bore of the tubes.

The valve may be any valve is operative to allow or prevent fluid flow through the bypass duct. In one arrangement, the valve disposed on the surface of one of the first and second ported pneumatic tubes. In such arrangement, the valve may be an arcuate member or sleeve that fits around at least a portion of the pneumatic tube. In another arrangement, the valve may be disposed within the bypass duct distally form either of the ported pneumatic tubes. In one arrangement, the valve is a butterfly valve.

DETAILED DESCRIPTION

Reference will now be made to the accompanying drawings, which at least assist in illustrating the various pertinent features of the present invention. In this regard, the following description of one embodiment of a rotary air valve used in conjunction with an in-line air brake is presented for purposes of illustration and description. It will be appreciated that other embodiments and applications for the of the air valve are possible and are considered within the scope of the present invention. Consequently, variations and modifications commensurate with the following teachings, and skill and knowledge of the relevant art, are within the scope of the present invention. The embodiments described herein are further intended to explain the best modes known of practicing the invention and to enable others skilled in the art to utilize the invention in such, or other embodiments and with various modifications required by the particular application(s) or use(s) of the present invention.

Pneumatic Carrier System Overview

Figure 1:
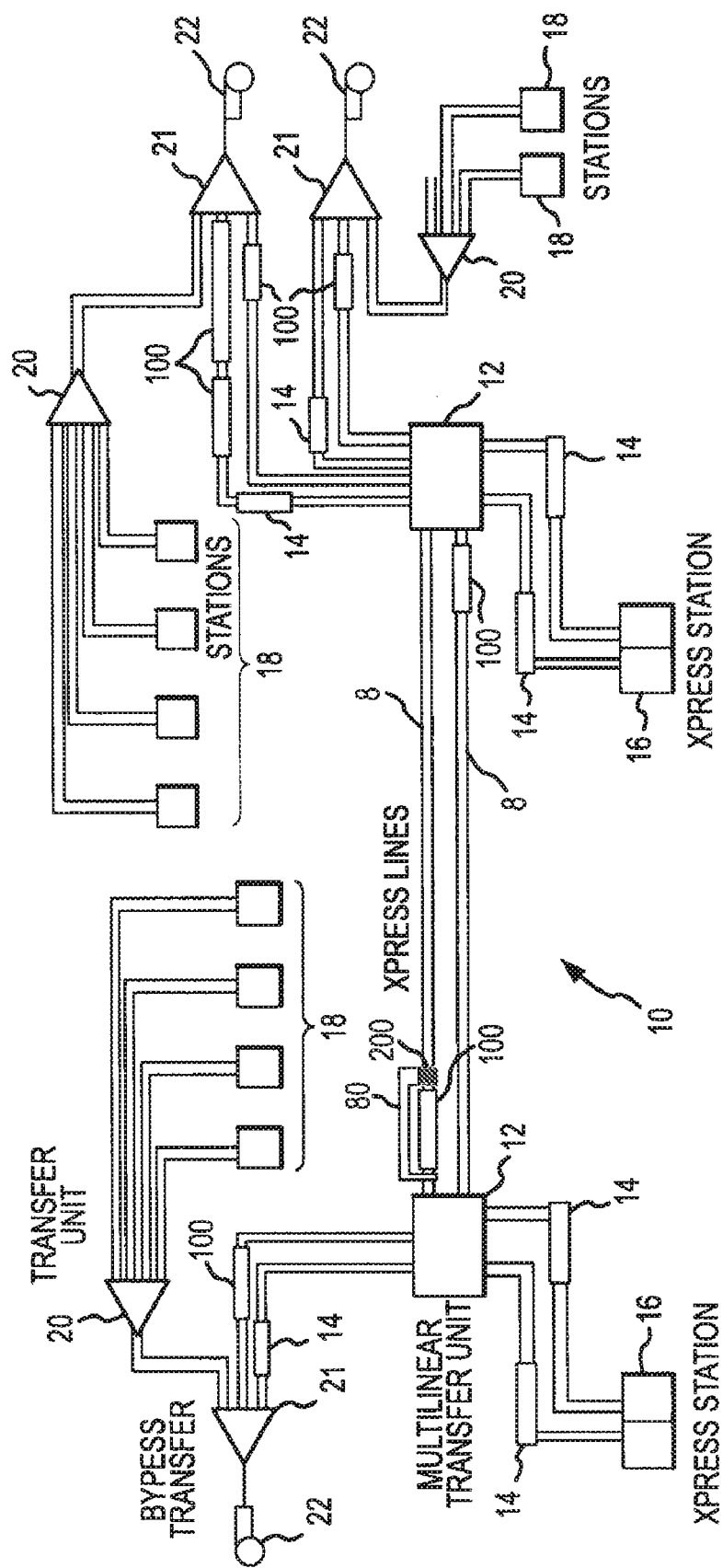
FIG. 1 illustrates a mechanical diagram for the pneumatic carrier system.

FIG. 1 illustrates a system diagram for a pneumatic carrier system 10 within which the invention described herein is employable. In general, the pneumatic carrier system 10 transports pneumatic carriers between various user stations 16, 18, each such transport operation being referred to herein as a "transaction". At each of the user stations 16, 18, a user may insert a carrier, select/enter a destination address/identification and a transaction priority, and then send the carrier. The system determines an optimum path to route the carrier and begins directing the carrier through the system.

Interconnected with each station 16, 18 is a transfer unit 20 which orders carriers arriving through different tubes from a different station 16, 18 into a single pneumatic tube. This pneumatic tube is further in connection with a vacuum by-pass transfer unit 21 (i.e., a turnaround transfer unit) and a blower 22 that provides the driving pneumatic force for carrier movement. A set of transfer units 20, 21, a blower 22 and one or more stations 16, 18 typically define a single zone. Generally, the blower 22 of each zone is operative to create pressure and/or vacuum (i.e., system pressure) within the pneumatic tube(s) of that zone. This pressure/vacuum is operative to create a pressure differential across a carrier disposed within the pneumatic tubes and causes the carrier to move through the pneumatic tubes. That is, the blower 22, transfer units and pneumatic tubes create a pneumatic circuit for use in transporting carriers between first and second points within the system 10. Multiple different zones may be interconnected (e.g., using a multi-linear transfer unit 12) to collectively define the pneumatic carrier system 10.

Within the system 10 itself, one or more devices are employable for ordering and routing carriers to their selected destinations. One type of device is a traffic control unit (TCU) 14 which is employable to receive, temporarily store and release a number of carriers. This functionality allows for launching a carrier from a user station 16, 18 prior to a path for a destination location being established. Likewise, this allows carrier tubes interconnecting the user station 16, 18 to be cleared for incoming traffic.

Also included in the system 10 are multi-linear transfer units (MTUs) 12 which have functionality to direct carriers from one pneumatic tube to another pneumatic tube (e.g., between tubes in single zone or between different zones). For example, a MTU 12 may receive a carrier released by a TCU 14 in a first pneumatic tube and direct the carrier into a second pneumatic tube in the system 10 to complete a given transaction.

Figure 2:
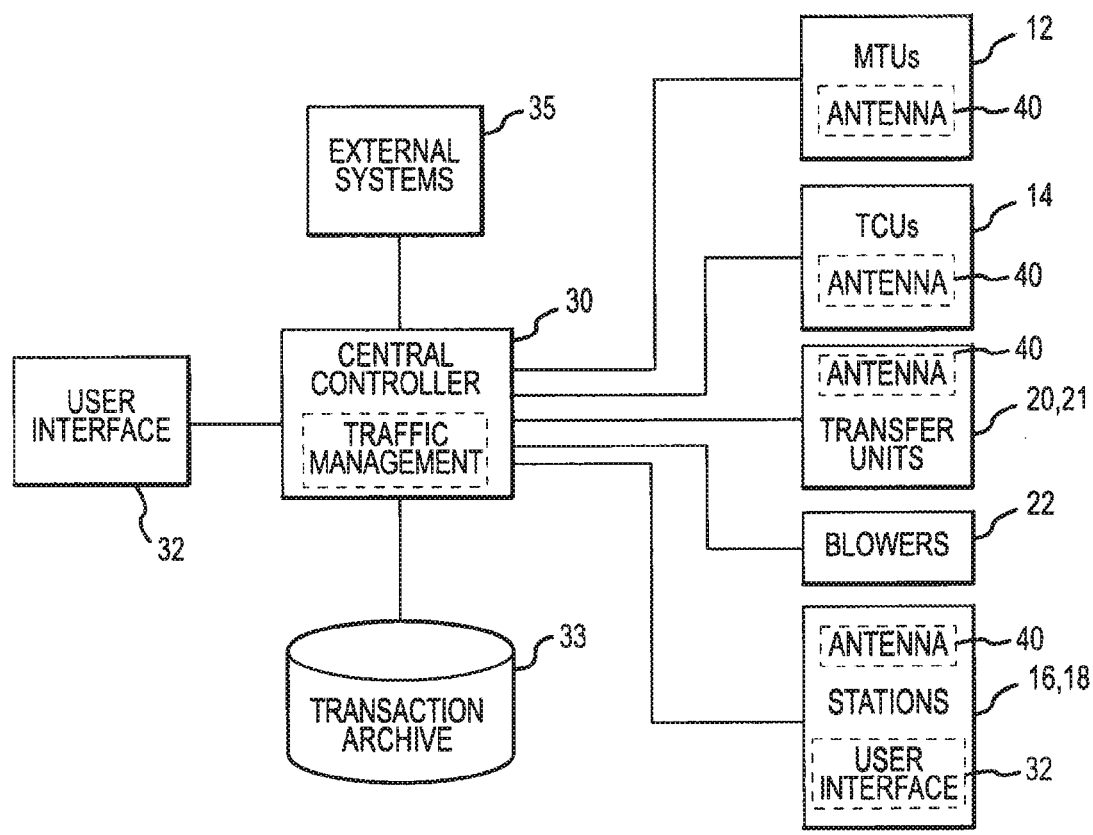
FIG. 2 illustrates a system diagram for the operation and monitoring of the pneumatic carrier system.

All of the components described in FIG. 1 are electronically connected to a system central controller (SCC) 30 that controls their operation and which is disclosed in the electrical system diagram of FIG. 2. The system central controller (SCC) 30 provides centralized control for the entire pneumatic carrier system 10 and may include a digital processor and memory/achieve 34. In addition to controlling the operation of the carrier system 10 as depicted in FIG. 1, the SCC 30 may provide additional functionality. Such functionality may include, without limitation, interconnection to external systems 35 and/or use of multiple reader devices/antennas 40 that may allow for reading identification information from carriers within the system 10. A system for RFID identification within a pneumatic carrier system is described in U.S. Pat. No. 7,243,002 entitled "System and Method for Carrier Identification in a Pneumatic Carrier System" having a filing date of Nov. 17, 2004, the contents of which are incorporated by reference herein.

Connectable to the SCC 30 may be one or more user interfaces 32 through which a system user may monitor the operations of the system and/or manually enter one or more commands to control its operation. Typically, at least one user interface 32 is located at or within an area serviced by stations 16, 18. For example, in a medical facility application, one or more user stations 16, 18 and at least one user interface 32 may be provided within each emergency room, laboratory, nursing station, etc. In this regard, the user interface may be contained in the stations 16, 18, or be stand-alone units. Components 12, 14, 16, 18, 20, 21 and 22 shown in FIG. 2 are representations of the various electrical and electro-mechanical systems that may be employed by the pneumatic carrier system 10. Although in FIG. 2 they are represented single blocks, one skilled in the art will realize that the block for each type of device represents the electronics for a number of the same or similar type of components positioned throughout the system which provides for its operation.

Figure 3:
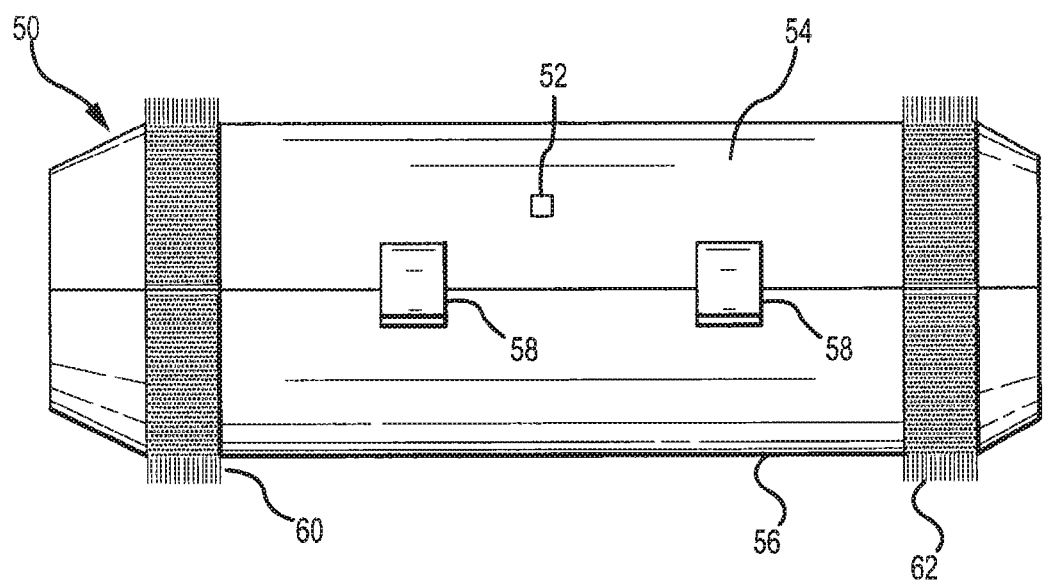
FIG. 3 illustrates a view of the pneumatic carrier including an identification chip.

One type of carrier 50 that may be utilized with the system 10 is illustrated in FIG. 3 and includes first and second shell members 54 and 56 that collectively define an enclosed space for use in carrying materials as they are transported through the system 10. These shell members 54, 56 are adjoinably cylindrical in cross-section for use in correspondingly cylindrical pneumatic tubes of the system 10. The shell members 54 and 56 may be pivotably interconnected by a hinge member (not shown), and latches 58 may be provided for securing the first shell member to the second shell member in a closed configuration. Also included as part of the carrier 50 are wear bands 60, 62. The wear bands 60, 62 are sized to snuggly fit within the inside surface of the pneumatic tubes in order to substantially block the passage of air across a carrier 50 within such a pneumatic tube. Accordingly, this blockage results in a pressure differential across the carrier 50 that results in the carrier 50 being pushed or drawn through the pneumatic tube. In the illustrated embodiment, an ID chip 52 is attached to one of the shell members 54. In this regard, antenna device/readers may be incorporated into pneumatic tubes within the system 10 to monitor the location and/or translocation of the carrier through the system.

Pneumatic Tube Brake

In one arrangement, a pneumatic tube brake 100, which allows for temporarily stopping a carrier in a pneumatic tube, is used as a traffic control unit. In this regard, the pneumatic tube brake may be disposed within a pneumatic system in order to temporarily hold one or more carriers at predetermined locations within the system. Furthermore, it will be appreciated that a plurality of such pneumatic tube brakes may be stacked end-to-end to provide the ability to store a corresponding plurality of carriers in-line in a pneumatic tube.

Figure 4:
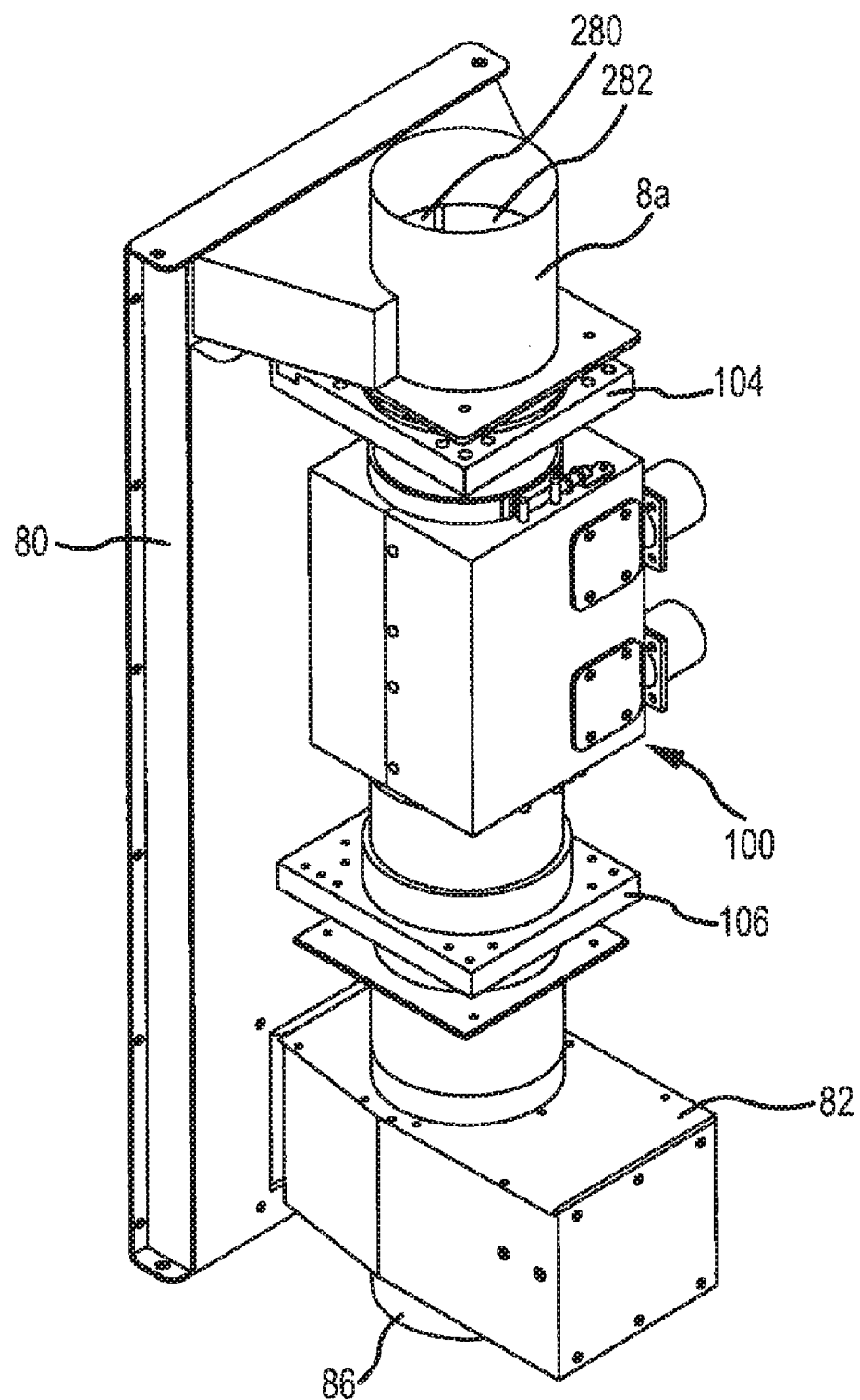
FIG. 4 illustrates a perspective view of a pneumatic tube incorporating a traffic control device and a by-pass duct.
Figure 5:
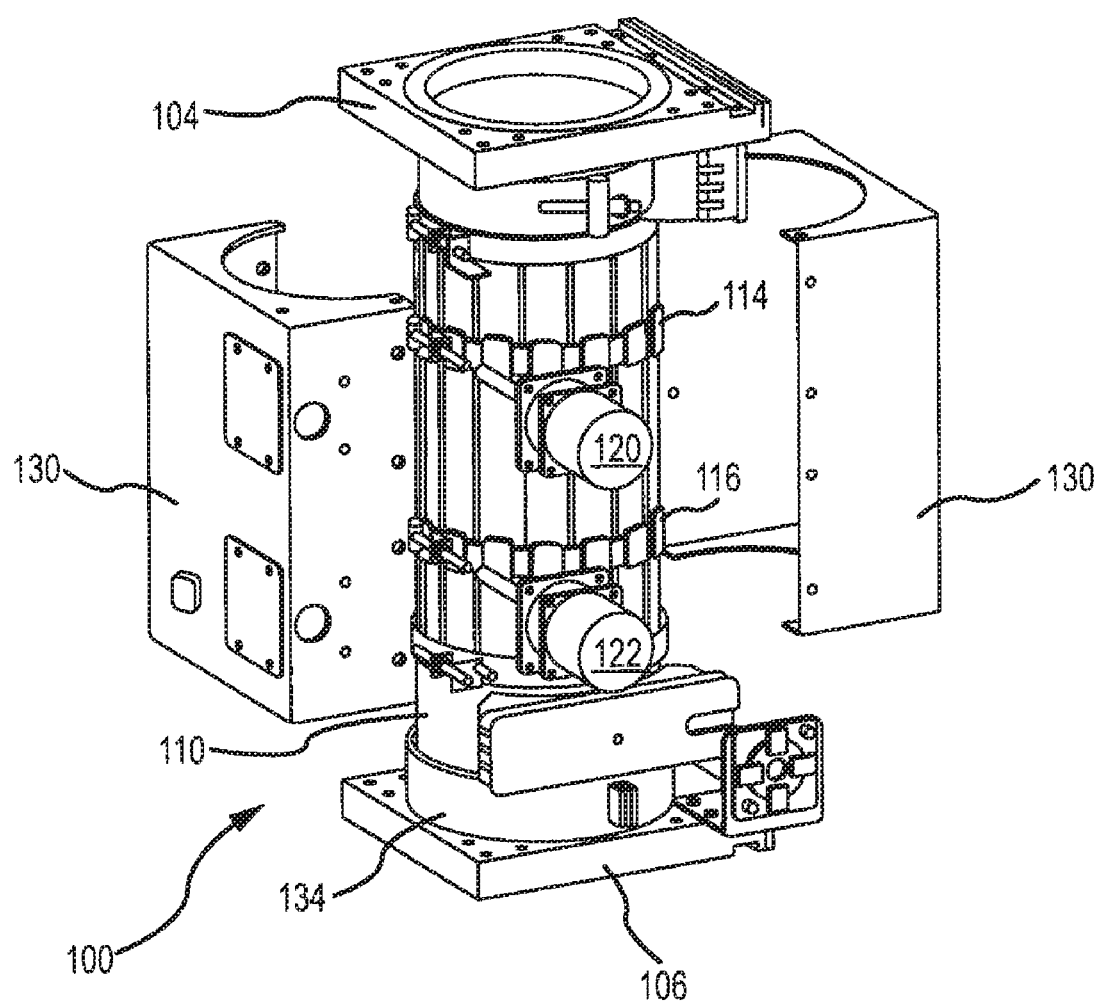
FIG. 5 illustrates a perspective view of one embodiment of a variable diameter traffic control unit.

As shown in FIG. 4, the pneumatic tube brake is disposed in-line between first and second pneumatic tubes 8a, 8b. FIG. 5 shows a partially exploded perspective view of the pneumatic tube brake, which is operative to impede and/or stop the passage of a pneumatic carrier passing through a pneumatic tube within the system 10. When interconnected in-line between first and second pneumatic tubes 8a, 8b, an internal bore of the pneumatic tube brake is aligned with the internal bores of the first and second pneumatic tubes 8a, 8b through which the pneumatic carrier 50 may be transported.

The pneumatic tube brake 100 is operative to arrest the movement of a pneumatic carrier as it passes through the pneumatic system. In the present embodiment, the pneumatic tube brake 100 utilizes a variable diameter pneumatic tube 110 that may be selectively constricted by first and second constraint bands 114, 116. These bands are controlled by first and second actuators 120, 122, which reduce the inside diameter or bore of the pneumatic tube brake 100 when activated. That is, the actuators 120, 122 are operative to apply a compressive force to one or more locations of the pneumatic tube 100 in order to deflect a sidewall portion of the tube 110 inward. A plurality of deflectable splines are formed into the tube 110 to permit deflection of the entire circumference of the sidewall of the tube 110. As illustrated, these splines are formed into the tube 110 using a plurality of axial cuts formed through a length of the sidewall of the tube. By controlling the amount of deflection of these splines inwardly relative to the bore of the variable diameter tube 110, a partial or full braking action may be applied to the wear bands of the pneumatic carrier 50 passing through the pneumatic tube brake 100.

To allow for in-line connection between first and second pneumatic tubes, the device utilizes a pressure jacket 130. As best shown in FIG. 5, this pressure jacket 130 formed of the shell members that mate around the outside of the tube from a location above the splines to a location below the splines. Accordingly, the pressure jacket 130 may be connected to the outside surface of the tube 110 utilizing any appropriate means. For instance, clamps or adhesives may be utilized. What is important is that the pressure jacket 130 prevents significant leakage of air through the device 100.

In order to utilize the pneumatic tube brake 100 as a TCU, it may be necessary to duct air around the device when a carrier is being held by the device. That is, a stationary carrier within the pneumatic tube brake 100 may result in a near complete blockage of a pneumatic tube line, preventing airflow through the tube and potentially preventing operation of downstream system components. To permit fluid flow around the device a by-pass duct 80 is utilized as shown in FIG. 4. The by-pass duct 80 is fluidly interconnected to the first and second tubes 8a, 8b at locations above and below the end plates 104, 106 of the pneumatic tube brake 100. The by-pass duct includes a valve 200 that allows for selective opening and closing airflow through the by-pass duct. That is, the valve 200 may be opened when the pneumatic tube brake 100 holds a carrier to allow routing airflow around the stationary carrier.

Air Valve

Figure 6A:
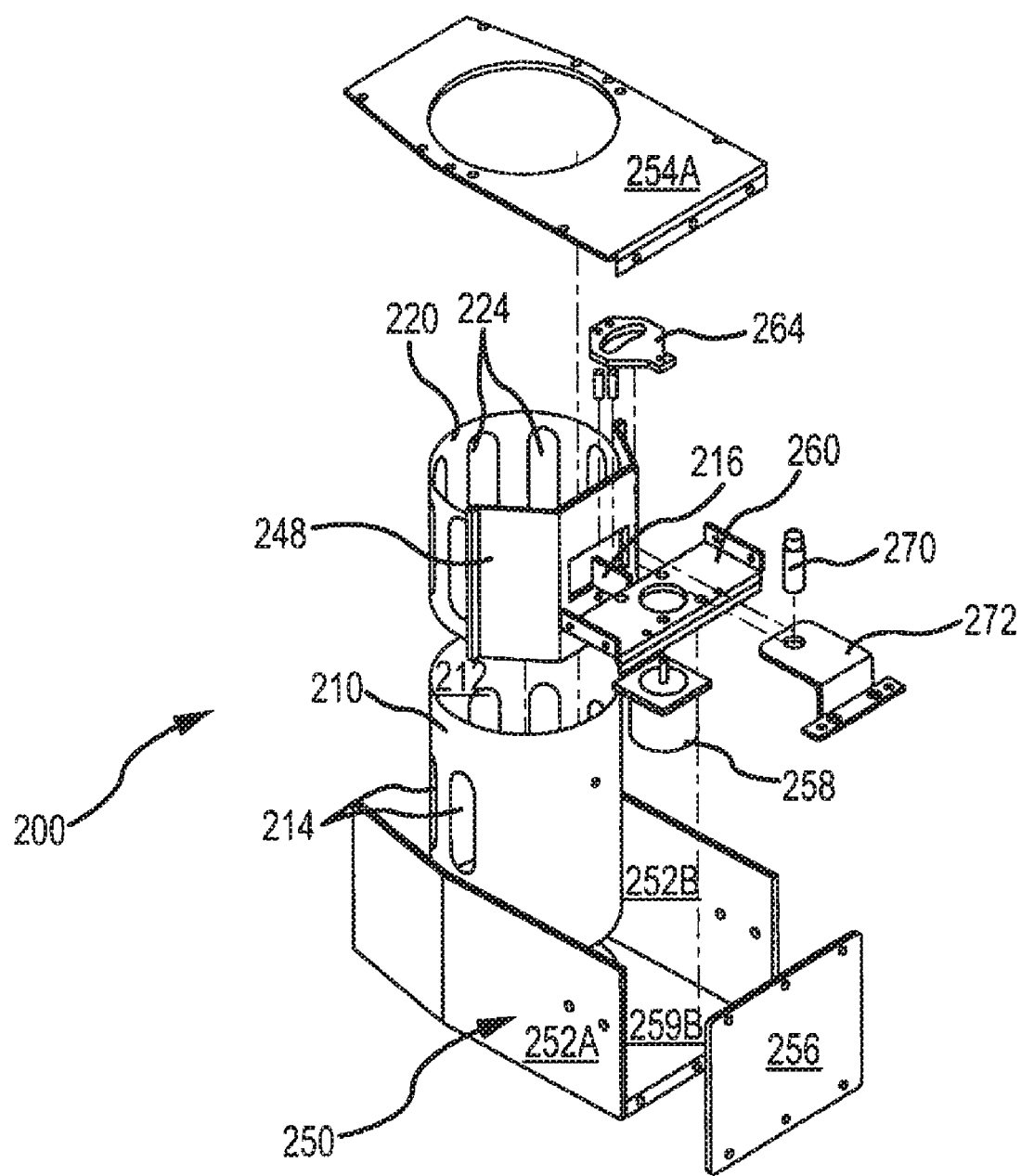
FIGS. 6A-6C illustrate a rotary air valve in accordance with various aspects of the invention.
Figure 6B:
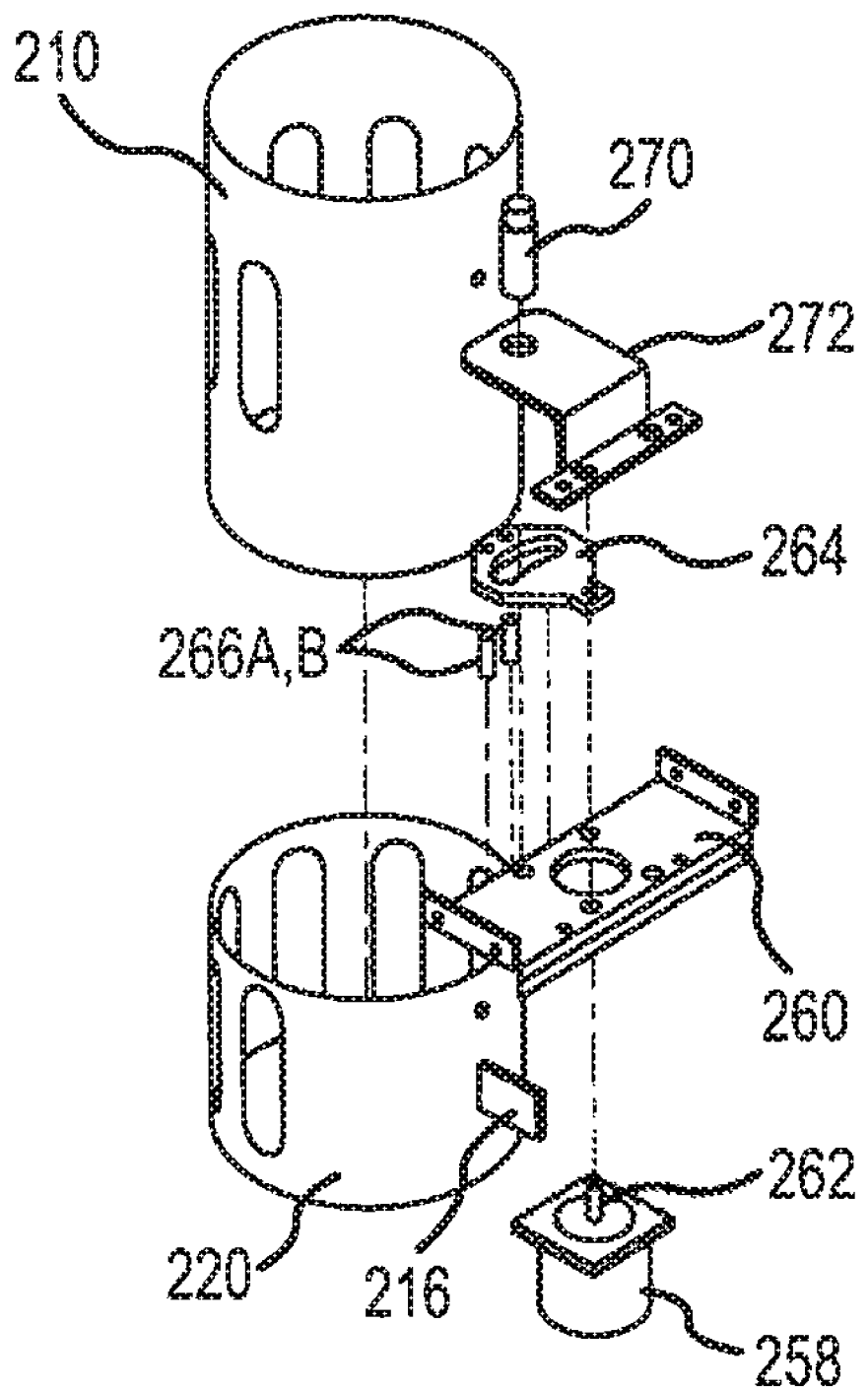
Figure 6C:
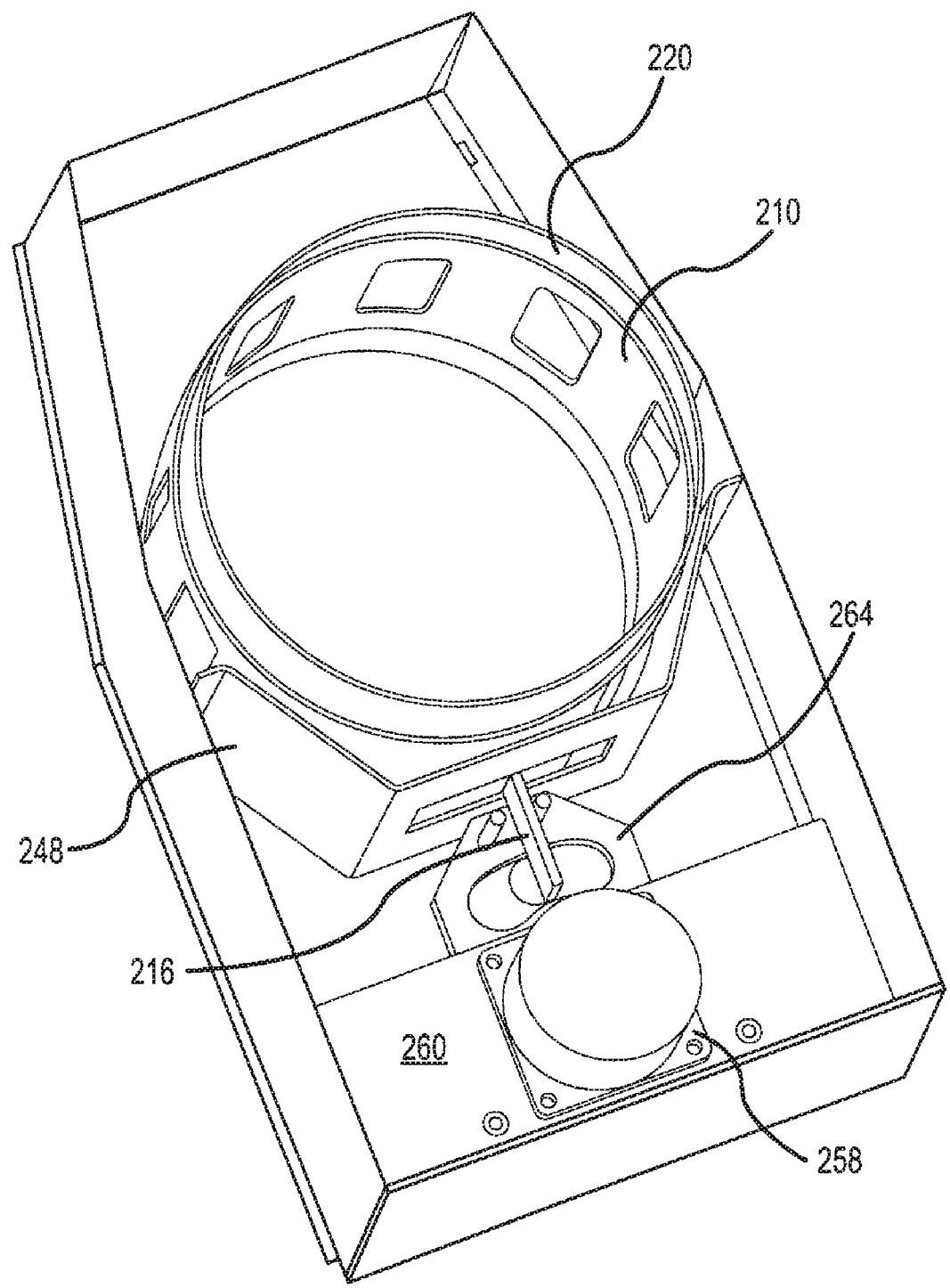

One embodiment of an air valve in accordance with various aspects of the present invention is provided in FIGS. 6A-6C. As shown, the valve 200 is a rotary valve assembly having an outer sleeve 220 that rotates around the outside surface of an inner sleeve 210. The inner sleeve 210 is formed from a pneumatic tube section having a diameter that is the same as the diameter of the pneumatic transport tubes of the pneumatic tube system. In this regard, the internal bore 212 of the inner sleeve 210 shares a common diameter with the pneumatic tubes of the system 10. Likewise, the internal diameter of the inner sleeve 210 is sized to permit the passage of a pneumatic carrier 50 there through. The outer sleeve or rotary sleeve 220 has an inside diameter that is slightly greater than the outside diameter of the inner sleeve. As illustrated in FIG. 6C, the outer sleeve 220 is disposed around the outside surface of the inner sleeve 210 when assembled. In one embodiment, the inner and outer sleeves may both be formed of similar materials, for example, materials that are utilized with the remainder of the pneumatic tube system (e.g., stainless steel). However, it will be appreciated that in other embodiments the inner and outer sleeves may be formed of other materials (e.g., plastics, composites, etc.) and/or dissimilar materials.

The inner and outer sleeves each include a plurality of apertures or fluid flow ports 214 and 224, respectively. As shown, these ports 214, 224 extend through the sidewalls of the respective sleeve members 210, 220. In the present embodiment, the ports 214, 224 are elongated and aligned with the central axes of the sleeves 210, 220. It will be appreciated that in other embodiments other port/aperture configurations may be utilized. For instance, a plurality of circular holes may be utilized. What is important is that the ports in the inner sleeve 210 and outer sleeve 220 are aligned in a first configuration and misaligned in a second configuration. That is, the valve may be selectively opened and closed.

Figure 7A:
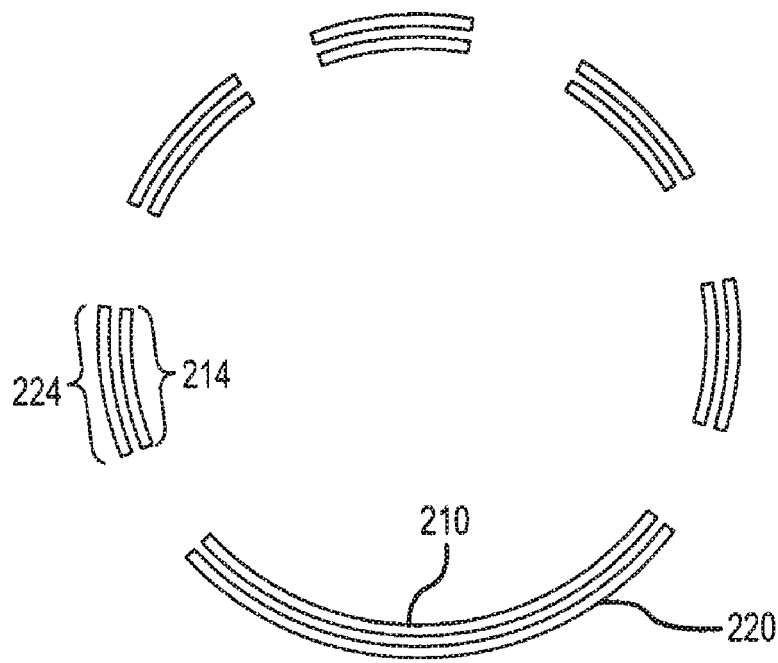
FIGS. 7A and 7B illustrate a cross-sectional view of the sleeve-in-sleeve arrangement of the rotary air valve of FIGS. 6A-6C.
Figure 7B:
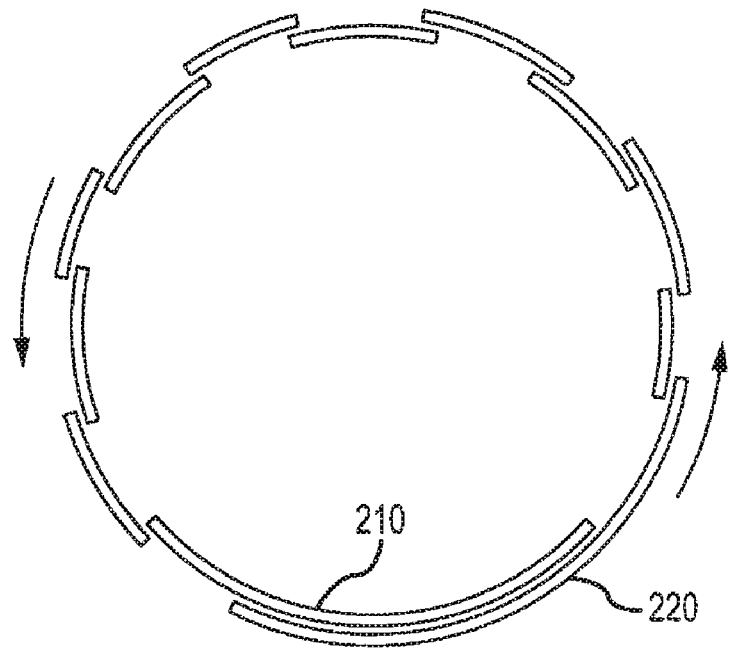

FIGS. 7A and 7B illustrate a cross-sectional view of the inner and outer sleeves 210, 220 in aligned and misaligned configurations, respectively. As shown in FIG. 7A, the inner sleeve 210 and its ports 214 are aligned with the ports 224 in the outer sleeve 220. In this regard, it will be appreciated that air passing through pneumatic tubes connected to the ends of the inner sleeve 210 may be exhausted through the aligned ports and diverted, for example, around one or more components within the pneumatic tube system.

In contrast, when it is desirable to maintain air flow axially through the inner sleeve 210 of the valve 200, the outer sleeve 220 may be rotated relative to the inner sleeve 210 to misalign the corresponding ports 214, 224. See, FIG. 7B. As shown, the solid sidewall sections (i.e., axial sidewall sections) between the ports 224 of the outer sleeve are disposed over the ports 214 of the inner sleeve 210 in the misaligned or closed position. In this regard, airflow passing through the valve 200 may be prevented from exiting the valve and is directed through the internal bore 212 of the internal sleeve 210.

In the present embodiment, the fluid flow ports 214, 224 are elongated apertures that extend along the length of the corresponding sleeves and are radially spaced around a center axis of the valve 200. It will be appreciated that the size, number and spacing of these apertures may be selected to allow for a desired fluid flow through the valve 200. For instance, the size and number of the apertures may be such that the valve is operative to divert all air flow around, for example, the brake device described above or any other system component. Generally, to reduce pressure losses, the combined area of the fluid flow ports or apertures may be at least fifty percent of the cross sectional area of the bore that carries the system air flow. In this regard, a braking device or other system component may hold a carrier stationary within the flow path of the system and the valve may selectively divert air flow around the stationary carrier with minimal pressure drop. Accordingly, airflow may continue to downstream components of the pneumatic system which may operate normally.

While the size and spacing of the ports/apertures 214, 224 may be selected based on fluid flow needs, it will be appreciated that such sizing and spacing may also be dependent upon the dimensions of the carriers utilized by the system. For instance, it may be desirable that the length of the apertures 214 within the inner sleeve 210 be shorter than the length between the first and second wear bands 60, 62 of the carrier. In this regard, at least one wear band of the carrier (which typically has two wear bands) will always be in contact with a solid portion of the inner sleeve when passing through the valve. This lessens the likelihood of air passing around a carrier disposed in the aperture/port section of the valve. Stated otherwise, limiting the axial length of the ports or apertures to less than the distance between the wear bands of a carrier lessens the likelihood of the carrier becoming stuck in the valve.

It will be appreciated that pneumatic tube systems often come in standard sizes. For instance, some standard pneumatic tubing sizes include 4 inch and 6 inch diameter tubes/pipes. In these arrangements, the carriers used by the system are typically between about 14 inches and about 18 inches in length and typically have first and second wear bands having an axial spacing that is between about six and eight inches. Accordingly, it is desirable that the axial length of the valve ports or aperture be less than 8 inches or even less than 6 inches. Stated otherwise, the length of the ports/apertures may be less than about twice the diameter of the pneumatic tube or less than about one and a half times the diameter of the pneumatic tube. This prevents airflow around the outside of the carrier (i.e., around the wear bands via the ports) as the carrier passes through the valve.

In addition, it will be appreciated that the radial dimension of each port or aperture may be limited. That is, if the width of the ports (i.e. arc length about the periphery of the tube) is too large, the wear bands of a carrier can catch on the edges of the port. To prevent such catching, it may be desirable that the ports have an arc length that is less than about 1.75 radians (i.e. an arc with an included angle θ of less than about 100 degrees). In an alternative embodiment, the ports may have an arc length with and included angle θ less than about 90 degrees. Further still, the included angle θ of the ports may be less than 70 degrees. Further, the edge surfaces of the apertures may be rounded to facilitate carrier passage.

Generally, limiting the width of the apertures or ports in the tubes permits a carrier to pass through unobstructed because there is enough structure between the multiple ports to maintain a proper orientation of a carrier contained therein. That is, a carrier is typically concentrically located within the pneumatic tube when passing through the bore. By maintaining an aperture or port arc length of having an included angle θ of less than 90 degrees and more preferably 70 degrees, an axial support extends between adjacent apertures or ports, which maintains the correct orientation of the carrier as it passes through the ported section of the tube.

It will be appreciated that the inside surface of the outer sleeve 220 and/or the outside surface of the inner sleeve 210 may include a coating or gasket material to provide an improved seal between the sleeves in the misaligned/closed position. For instance, one or more of these surfaces may be coated with a rubberized or felt-like material that improves sealing between the sleeves when in the closed position. However, this is not a requirement.

In order to direct airflow out of the sleeve members, a housing 250 is interconnected to the outside surface of the inner sleeve 210 at axial positions above and below the apertures 224. The housing 250 forms an enclosure that houses the outer/rotary sleeve 220 as well as the components that are utilized to effect rotation of the outer sleeve 220. In the present embodiment, this housing 250 is a sheet metal housing having first and second lateral sidewalls 252A, 252B top and bottom plates 254A, 254B, and an end plate 256. The housing 250 directs airflow coming out of the valve or into the valve, as the case may be, to/from a bypass duct 82. See e.g., FIG. 4. In the present embodiment, inner sleeve 210 passes through the top and bottom plates 254A, 254B and these plates are disposed adjacent to the ends of the outer sleeve 210. Accordingly, these plates may also maintain the axial positioning of the outer sleeve relative to the inner sleeve. In addition, a baffle plate 248 directs airflow toward the open end of the housing 250 and into the bypass duct 80. See FIG. 4.

In order to rotate the outer sleeve 220 relative to the inner sleeve 210, the valve 200 utilizes a stepper motor 258. As shown in FIGS. 6A-6C, the stepper motor 258 is interconnected to the rotary/outer sleeve 220 via a mechanical linkage that allows for selectively rotating the outer sleeve 220 to align or misalign the corresponding apertures 214, 224. Specifically, the stepper motor 258 is interconnected to a motor mounting bracket 260 that extends between the lateral sidewalls 252A, 252B of the jacket/housing 250. An output shaft of the stepper motor 262 is fixedly interconnected to a cam member 264. During operation, selective movement of the stepper motor 258 is operative to move the cam member 264 about the rotational axis of the output shaft 262. Interconnected to a distal end of the cam member 264 are first and second drive pins 266a, 266b. These drive pins are disposed on opposite sides of a drive plate 216 that is fixedly connected to the outside surface of the outer sleeve 220. Accordingly, when the stepper motor 260 is driven the output shaft 262 turns the cam member 264, which translates this rotational movement via the drive pins 266a, 266b to the drive plate 216 and thereby rotates the outer sleeve 220. It will be appreciated that other drive mechanisms including, without limitation linear drive, gear driven, belt driven and/or rotary drive mechanisms are possible and within the scope of the present invention.

The present embodiment further includes a sensor (e.g., a Hall Effect sensor) that is operative to monitor the positioning of the cam 264. Specifically, the sensor 270 is mounted to a mounting bracket 272 that is disposed above the cam 264. In the present embodiment, the cam 264 also includes a cam aperture 268. The sensor 270 is operative to monitor the cam aperture 268. Upon identifying an end surface of the aperture 268, the sensor 270 generates an output indicating that the outer sleeve 220 is one of open or closed. It will be further appreciated that the sensor may be utilized to determine intermediate positions of the rotary outer sleeve 220 relative to the inner sleeve 210. In this regard, the sensor 270 may be operative to provide an indication of when the rotary sleeve is partially open or partially closed. As will be appreciated, this may allow for providing partial fluid flow through the valve.

Figure 8:
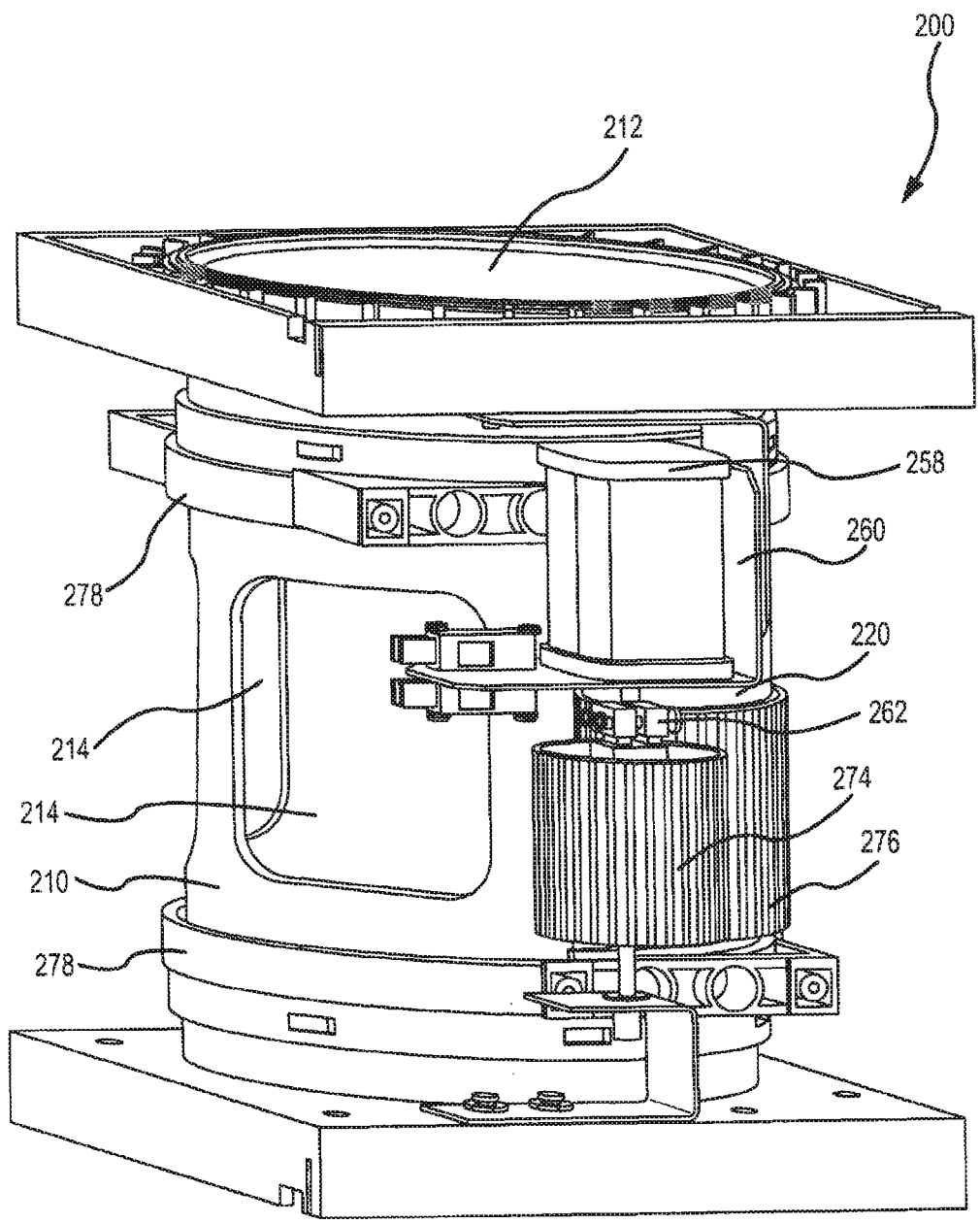
FIG. 8 illustrates a perspective view of another embodiment of an air valve.

An alternative embodiment of a pass-through air valve 200 is depicted in FIG. 8. Again the air valve includes outer sleeve 220 disposed about a ported pneumatic transport tube or inner sleeve 210. However, in the embodiment depicted, the outer sleeve 220 is disposed circumferentially around only a portion of the inner sleeve 210. That is, the outer sleeve may be formed as a semi-cylindrical or otherwise arcuate member. The inner sleeve may include a plurality of apertures 214 that extend through a sidewall of the inner sleeve 210. In one embodiment, the combined cross sectional area of the apertures 214 is at least fifty percent of the cross sectional area of the bore 212. In another embodiment, the cross sectional area of the apertures 214 is more than about seventy percent of the cross sectional area of the internal bore 212.

The outer sleeve 220 of the illustrated embodiment forms a solid sidewall having an axial length that is equal to or greater than of the axial length of the apertures 214. In an open position, the outer sleeve 220 is positioned away from the apertures 214 such that air may freely flow out of or into the inner sleeve. In a closed position, the outer sleeve 220 may be moved adjacent to apertures 214 such that it covers the apertures. To this end, inner or outer sleeves may include, adjacent to their mating surfaces a sealing member. The sealing member may include felt, an elastomeric material, or any other suitable material known in the art. The outer sleeve 220 is controllably rotated about the exterior of the inner sleeve 210. In this regard, the outer sleeve 220 may circumferentially move with respect to the inner sleeve 210 with the ends of the outer sleeve 220 traveling in races 278 connected to the outside surface of the inner sleeve. An actuator effects this movement of the outer sleeve 220. Examples of such actuators include, but are not limited to eclectic motors, stepper motors, linear actuators, or the like. Shown in FIG. 8, the actuator is a stepper motor 258.

The stepper motor 258 may be controlled such that precise increments of the movement of the output shaft 262 of the stepper motor 258 may be achieved. The output shaft 262 may be coupled to a gear 274. Additionally, the outer sleeve 220 may have a plurality of gear teeth 276 provided circumferentially on an outside surface. It is to be understood that the gear teeth 276 may be provided integrally with the outer sleeve 220 or may be affixed to the outer sleeve 220 in any appropriate fashion (e.g., adhered, riveted, etc.) as is known in the art. The gear 274 may be provided in a meshed arrangement with the gear teeth 276 such that rotation of the gear 274 produces circumferential movement of the outer sleeve 220. In this regard, by controlling the stepper motor 258, power may be transmitted via the output shaft 262 to the gear 274 and further to the gear teeth 276 such that an output of the stepper motor 258 produces relative movement of the outer sleeve 220 with respect to the inner sleeve 210. As such, the stepper motor 258 may be used to selectively position the outer sleeve 220 with respect to the inner sleeve 210.

As noted above, the ability to provide multiple ports or apertures through a sidewall of a pneumatic tube (i.e., a multiple ported pneumatic tube) allows for effectively directing air flow into and/or out of the bore of such pneumatic tubes without significant pressure drop. In the embodiments discussed above, a sleeve-in-sleeve arrangement is used to selectively open and close the apertures of such multiple ported pneumatic tubes. However, it has also been recognized that multiple ported pneumatic tubes may be utilized in conjunction with a diversion or bypass duct where a valve is removed from the multiple ported pneumatic tube(s).

For instance, a pneumatic system component (e.g., inline break, TCU, MCU, etc) may be disposed between first and second pneumatic tubes. Each of these tubes, may includes multiple ports in a perforated section. Again, the size and orientation of these ports may be such that the ports are able to divert all or most of the air flow flowing through the internal bores of the tubes (i.e., through the system component) without significant pressure drop. In this regard, it may be desirable that the combined area of the ports through these tubes be at least fifty-percent of the cross-sectional area of the bore of the pneumatic tubes. In addition to the overall combined area of the ports, it may again be desirable that the axial length of the ports is less than the distance between the wear bands of the carrier designed to pass through the system. Likewise, it may be desirable that the arc length of these ports (i.e., defined by the included angle thereof) is less than 90 degrees and more preferably less than about 70 degrees.

In any arrangement, the ports on the inlet tube and outlet tube are surrounded by a housing that directs air flow into or out of the ports and into a bypass duct. Located in the bypass duct between the inlet tube and outlet tube is a valve that is operative to open and close air flow through the bypass duct. In this regard, it will be appreciated that when the valve is closed, air flow is directed through the internal bores of the inlet and outlet tubes and through the system component disposed there between. However, when the system component is occupied by, for example, a pneumatic carrier the valve may be opened to allow fluid flow to continue around the obstructed system component and continue downstream. As will be appreciated, this permits downstream system components to continue normal operation.

The foregoing description of the packaging design has been presented for purposes of illustration and description. Furthermore, the description is not intended to limit the invention to the form disclosed herein. Consequently, variations and modifications commensurate with the above teachings, and skill and knowledge of the relevant art, are within the scope of the invention. The embodiments described hereinabove are further intended to explain best modes known of practicing the invention and to enable others skilled in the art to utilize the invention in such or other embodiments and with various modifications required by the particular application(s) or use(s) of the invention. It is intended that the appended claims be construed to include alternative embodiments to the extent permitted by the prior art

What is claimed is:

1. A pass-through valve for a pneumatic tube carrier system, comprising:
   a pneumatic tube having an internal bore at least partially defined by a sidewall extending between a tube inlet and a tube outlet, wherein the internal bore has an internal diameter that is sized to accommodate the passage of a pneumatic carrier there through and the sidewall includes a first plurality of apertures;
   an outer sleeve circumferentially surrounding at least a portion of an outside surface of the pneumatic tube, wherein the outer sleeve is moveable between an open position and a closed position free of obstruction of said internal bore;
   an actuator in operative communication with the outer sleeve and operative to move the outer sleeve with respect to the pneumatic tube between the open position and the closed position, wherein when in the closed position the outer sleeve covers the apertures to maintain fluid flow through internal bore of the pneumatic tube and when in the open position the outer sleeve allows for fluid flow through the apertures to exhaust fluid from the internal bore of the pneumatic tube to an exterior of the pneumatic tube.

2. The apparatus of claim 1, wherein the outer sleeve has a second plurality of apertures extending through a sidewall of the outer sleeve, and wherein the first plurality of apertures are aligned with the second plurality of apertures in the open position and the first plurality of apertures and the second plurality of apertures are misaligned in the closed position.

3. The apparatus of claim 1, wherein the outer sleeve completely circumferentially surrounds the inner sleeve.

4. The apparatus of claim 1, further comprising:
   a housing disposed about an outside surface of the pneumatic tube and enclosing the outer sleeve, the housing having an outlet, wherein the housing directs fluid flow exhausted out of the apertures when the outer sleeve is in the open position to an exterior of the pneumatic tube through the outlet.

5. The apparatus of claim 4, wherein the pneumatic tube extends through the housing.

6. The apparatus of claim 1, wherein the actuator moves the outer sleeve axially with respect to the pneumatic tube.

7. The apparatus of claim 1, wherein the actuator moves the outer sleeve radially with respect to the pneumatic tube.

8. The apparatus of claim 1, wherein a cross sectional area of the first plurality of apertures is at least fifty percent of a cross sectional area of the internal bore.

9. The apparatus of claim 1, wherein the cross sectional area of the first plurality of apertures is at least seventy percent of a cross sectional area of the internal bore.

10. The apparatus of claim 1, wherein the first plurality of apertures comprise a plurality of elongate ports extending parallel to a center axis of the first bore.

11. The apparatus of claim 10, wherein the plurality of elongate ports are evenly spaced circumferentially about the sidewall of the pneumatic tube.

12. The apparatus of claim 1, wherein the first plurality of apertures are shorter in length than a span equal to twice the internal diameter.

13. The apparatus of claim 1, wherein the actuator is an electric motor.

14. The apparatus of claim 1, further comprising:
   a sensor for determining a position of the outer sleeve relative to the pneumatic tube.

15. The apparatus of claim 1, further comprising:
   a sealing member disposed within the outer bore and adjacent to, the inner sleeve such that the sealing member is in sealing engagement with the outer sleeve and the inner sleeve when the outer sleeve is in the closed position.

16. A pass-through valve for use in a pneumatic carrier system, comprising:
   a tube having an internal bore extending between an inlet and an outlet, wherein the internal bore has an inside diameter sized to accommodate passage of a pneumatic carrier;
   at least first and second apertures extending through a sidewall of the tube, wherein a combined area of the apertures is at least half of the cross-sectional area of the internal bore;
   an arcuate member sized for conformal positioning around at least a portion of an outside surface of the tube, wherein the arcuate member is moveable between an open position and a closed position free of obstruction of said internal bore; and an actuator for moving the arcuate member between at least the open position and the closed position, wherein when in the closed position the arcuate member covers the apertures to maintain fluid flow through the internal bore and when in the open position the arcuate member allows for fluid flow through the apertures to exhaust fluid from the internal bore to an exterior of the tube.

17. The apparatus of claim 16, wherein the apertures are separated by a sidewall portion that extends axially between the first and second axial locations.

18. The apparatus of claim 16, wherein the apertures are disposed through the sidewall between first and second axial locations along the length of the tube, wherein a distance between the first and second axial locations is less than twice the inside diameter of the tube.

19. The apparatus of claim 18, wherein the distance is less than one and a half times the inside diameter of the tube.

20. The apparatus of claim 16, wherein a maximum arc length of each of the apertures extending through the sidewall is less than about 1.75 radians.

21. The apparatus of claim 20, wherein the arc length is less than about 1.3 radians.

22. The apparatus of claim 16, wherein the arcuate member comprises a semi-cylindrical member.

23. The apparatus of claim 16, wherein the arcuate member further comprises:
apertures that correspond to the apertures in the sidewall of the tube, wherein in the open position the apertures in the arcuate member are aligned with the apertures through the sidewall of the tube.

24. The apparatus according to claim 4, wherein the housing defines a bypass duct for directing fluid flow exhausted from the apertures when the outer sleeve is in the open position exterior to the pneumatic tube to another portion of the pneumatic tube.

25. The apparatus according to claim 24, wherein said another portion of the pneumatic tube is downstream of the apertures.

* * * * *